United States Patent Office 2,912,579
Patented Nov. 10, 1959

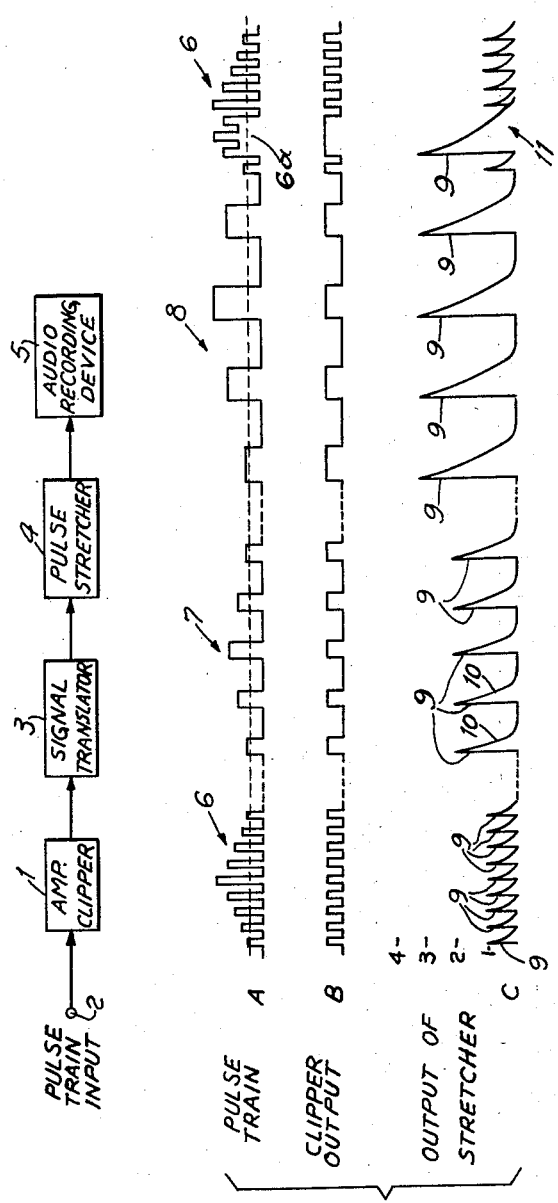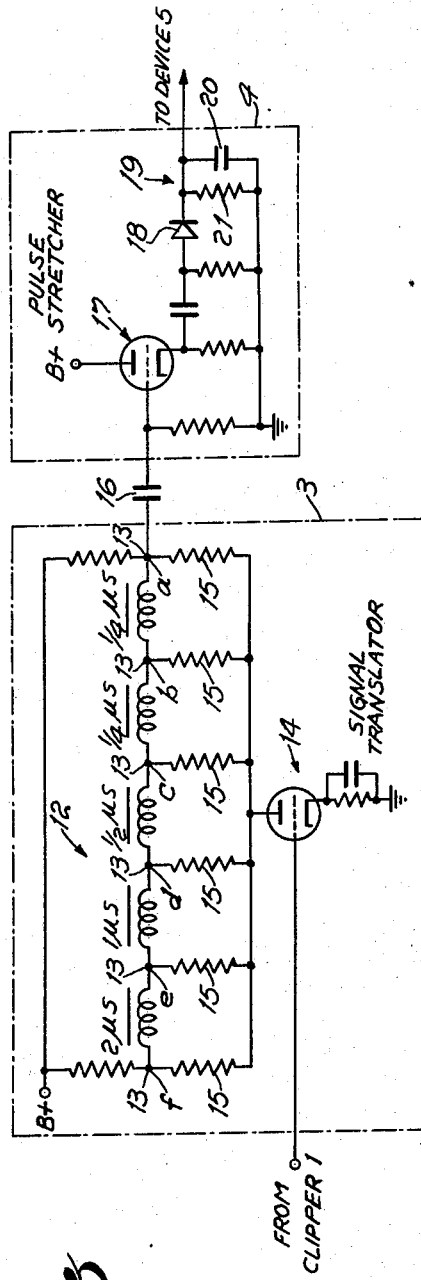

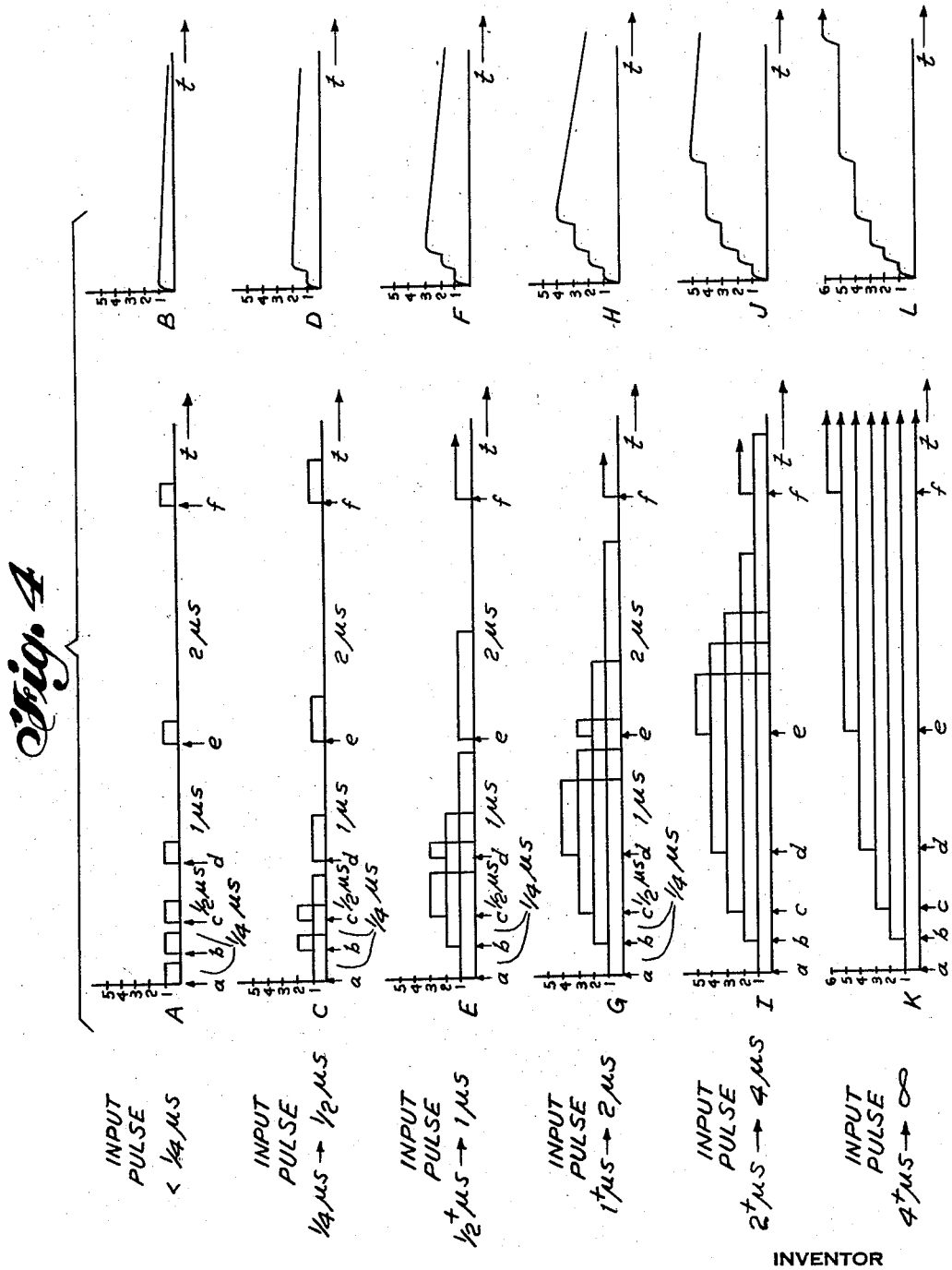

2,912,579

PULSE WIDTH AND REPETITION RATE DISCRIMINATOR

John K. Bates, Jr., Bloomfield, N.J., assignor to International Telephone and Telegraph Corporation, Nutley, N.J., a corporation of Maryland Application December 9, 1955, Serial No. 552,220

9 Claims. (Cl. 250—27)

This invention relates to signal discriminators and more particularly to means for discriminating between signals of different pulse widths and different repetition frequencies.

The identification of a particular one of a plurality of received signal waves is important in equipment used to locate the position of the transmitters radiating the plurality of received signal waves. In general, the received signals may be identified on the basis of carrier frequency, pulse widths, repetition rates of the pulses, or a combination of such distinguishing characteristics. A more specific type of received signal may include a burst of pulses from a plurality of transmitters wherein the burst of pulses is provided by a scanning-type transmitter antenna or a transmitter which is energized periodically, as is encountered, for instance, in the transmission of some radar or beacon type signals. The pulse bursts of the individual transmitters usually are characterized by a given pulse burst recurrence frequency, a given width of pulse in the pulse burst and a given repetition of the pulses in the pulse burst which usually is different from other receivable transmitter signals. Identification of the individual signal or pulse burst may be accomplished by detecting the pulse width and repetition frequency of the pulses in the pulse burst. From this information, which may be recorded and later analyzed, it is possible to determine not only the pulse width and repetition frequency of the pulses of a pulse burst but also the recurrence frequency of the pulse bursts provided the recording of the former information is related to a given time base.

Therefore, it is an object of this invention to provide means to discriminate between signals of different pulse widths and different repetition frequencies.

Another object of this invention is to provide a signal discriminator to discriminate between signals of different pulse widths and different repetition frequencies in a manner amenable to audio recording of the derived information.

A feature of this invention is the provision of a signal discriminator to discriminate between signals of different pulse widths and different repetition frequencies comprising a translator to translate pulse width signals to amplitude pulses having discrete amplitude levels which are a function of the time duration of the pulse width signals. The amplitude pulses are then stretched in time to increase the audio power of the low frequency components and, of particular interest in this application, the repetition frequency component thereof to render the width and repetition frequency component amenable to recording on an audio recording device.

Another feature of this invention is the provision of a delay line to derive amplitude pulses from the pulse width signals having a plurality of discrete amplitude levels, each of said amplitude levels representing a range of pulse widths. The ranges of pulse widths and the corresponding discrete amplitude level are provided by tapping the delay line to divide the time delay in accordance with a geometric progression, the time elapse between each tap representing the pulse width range. The pulse width signals are applied in common to each of the delay line taps such that the output of the delay line increases in discrete steps when the width of the input pulse exceeds the elapsed time between successive ones of the delay line taps.

The above-mentioned and other features and objects of this invention will become more apparent by reference to the following description taken in conjunction with the accompanying drawings, in which:

Fig. 1 is a block diagram of the signal discriminator following the principles of this invention;

Fig. 2 is a series of waveforms useful in explaining the operation of the circuit of Fig. 1;

Fig. 3 is a schematic diagram of a signal translator and pulse stretcher of Fig. 1; and Fig. 4 is a series of waveforms useful in explaining the operation of the circuit of Fig. 3.

Referring to Fig. 1, the basic components of the signal discriminator of this invention are shown to comprise an amplitude clipper 1 to assure that the signals applied at terminal 2 have a constant amplitude before their introduction to the signal translator 3. Translator 3 operates on the pulse width signals applied thereto to produce amplitude pulses having discrete amplitude levels which are a function of the width of the pulse applied to the input of translator 3. These amplitude pulses are applied to pulse stretcher 4 which stretches the time duration of the amplitude pulses so that the power of the repetition frequency component of the pulse width signal is increased to enable the recording thereof on an audio recording device 5. The device 5 may be any of the well-known audio recorders, such as a magnetic tape recorder.

Curve A of Fig. 2 illustrates a typical train of pulse width signals upon which the signal discriminator of this invention is capable of operation. The pulse train of curve A illustrates that the signal input at terminal 2 includes three pulse bursts or group of pulse width signals 6, 7 and 8 wherein each of the signals includes a plurality of pulses having a distinguishing width and repetition frequency characteristic. Pulse burst 6 is illustrated as having a recurrence frequency such that there is an overlapping at 6a between a portion of the signal 8 and signal 6. It is to be further understood that the recurrence rates of pulse bursts 7 and 8 are not necessarily identical to each other or to the recurrence rate of pulse burst 6. When the pulse train of curve A, Fig. 2, is applied to clipper 1, there is produced a clipped output, as illustrated in curve B of Fig. 2, wherein the pulses of each signal have a constant amplitude.

As each of the pulses of the signals of curve B are applied to translator 3, there is produced at the output thereof an amplitude pulse which is a function of the width of the pulse applied to the input thereof. This is illustrated by the vertical portions 9 of the pulses of curve C, Fig. 2. It will be noted that the amplitude pulses each have a discrete amplitude level 1, 2 or 3, where each of said amplitude levels represents a region or band of pulse widths. The production of the discrete amplitude level pulses will be described in more detail in connection with the description of Fig. 3.

The sloping portion 10 of the pulses of curve C, Fig. 2, represents the stretching in time of the peak amplitude pulses 9 which results in an increase of repetition frequency power enabling the recording of this repetition frequency component in recording device 5. The information recorded on recorded device 5 may be analyzed by suitable readout devices to enable the identification of a particular signal received by the equipment. This readout device may include means responsive to the discrete amplitude levels achieved by the different pulses and, in conjunction with a counter, indicate the number of levels the amplitude pulse has achieved. This amplitude information can then be related by given factor to the range of pulse widths present in the received signal. Further, by squaring and then differentiating the audio output of device 5, it is possible to obtain, again in conjunction with a counter, the repetition frequency of the pulses included in a particular pulse burst. Due to the characteristics of the presently known readout arrangements, a situation where there is an overlap between two different signals may produce an error in both the amplitude and repetition frequency of those signals which are overlapped. However, due to the recurrence of the pulse bursts at different recurrent frequencies, the predominate pulse width and repetition frequency information may be taken as the correct information. Such an overlapping situation which may result in an error in the readout device is indicated at 11 in curve C, Fig. 2.

Referring now to Fig. 3, the signal translator 3 is illustrated as comprising a delay line 12 having a plurality of taps 13 therealong to divide the delay time of delay line 12 in accordance with a geometric progression into a plurality of different sequential time intervals. The clipped signal from clipper 1 is coupled to an amplifier 14 which then feeds the pulse width signal by means of resistors 15 in parallel and simultaneously to taps 13. The peak amplitude of the pulse coupled from delay line 12 depends on the width of the pulse introduced to the taps of the delay line. If the input pulse has less width than the smallest time interval, then the output voltage will be substantially identical to the amplitude of the pulse applied to taps 13. If the width of the input pulse is greater than the smallest time interval but less than the combined time interval of the smallest and next adjacent time interval, then the output pulse will have an amplitude equal to substantially twice the amplitude level of the input pulse. As the width of the input pulse progressively increases through the successive ranges of pulse widths as established by the elapsed time represented by the time intervals between the taps of the delay line, the amplitude pulse level at the output will progressively increase from one discrete amplitude level to the next as the width of a pulse overlaps more and more of the time intervals.

The amplitude pulses are then coupled through condenser 16 to pulse stretcher 4 which includes a cathode follower circuit 17 for matching the impedance of delay 12 to a unidirectional device 18 illustrated herein as a crystal rectifier, but may, of course, be another type of known unidirectional device. The unidirectional device 18 is in turn coupled to a time constant circuit 19 including condenser 20 and resistor 21. Upon application of an amplitude pulse to device 18, condenser 20 is charged to substantially the peak amplitude of the amplitude pulse in a relatively short time therethrough. Once condenser 20 has been charged to the peak amplitude of the pulse applied to device 18, condenser 20 will commence to discharge through the path provided by resistor 21. This discharge or decay of the potential stored on condenser 20 is made relatively long by adjusting the values of resistor 21 and condenser 20 to establish a relatively long time constant. This relatively long decay time of the charge on condenser 20 acts to stretch the time duration of the amplitude pulse and thereby increases the repetition frequency component included in the amplitude pulse. This stretching of the time duration of the amplitude pulse enables the recording of the amplitude level which is a function of the pulse width of the input pulse and the repetition frequency component thereof in an audio manner on an audio recording device.

Returning again to the signal translator 3, let us assume, for purposes of example, that delay line 12 has a delay time of four microseconds and that the taps are disposed therealong at one-quarter microsecond, one-half microsecond, one microsecond, two microsecond, and four microsecond locations along delay line 12. Since the delay line 12 is tapped at intervals according to the percentage accuracy desired, the tapping, as set forth hereinabove, will provide for an accuracy of ±25%. Now let us assume that an input pulse has a width less than one-quarter microsecond wide. When this occurs, there will appear at each tap a pulse which is less than one-quarter microsecond wide. This is illustrated in Fig. 4, curve A. When this situation occurs, the output voltage will be unchanged with respect to the input voltage and will correspond to a discrete amplitude level one. When this output voltage is coupled to stretcher 4, there is obtained a pulse signal, as represented in curve B, Fig. 4, having a peak amplitude corresponding to amplitude level one and stretched in time duration. It should be pointed out at this point that the waveform of curve B is identical to the waveform on curve C of Fig. 2 for one pulse but on a much extended scale, thus explaining the apparent distortion and discrepancy between the two waveforms.

Now let us assume that a pulse width input is wider than one-quarter microsecond but less than one-half microsecond. The resultant overlap at certain taps along the delay line is illustrated in curve C of Fig. 4. It will be immediately recognized that this overlap at adjacent taps of the delay line 12 results in a pulse output having an amplitude equal to twice the input pulse amplitude representing the second discrete amplitude level which, when acted upon by stretcher 4, produces an output pulse, as illustrated in curve D, Fig. 4. As the width of the pulses increases to extend over more and more successive delay line taps, the amplitude level will increase as this number of overlaps increases with increasing pulse width, each range of pulse width and resulting amplitude level achieved being illustrated in curves E, G, I and K of Fig. 4. The resulting pulse output of stretcher 4 is illustrated in curves F, H, J and L associated with their respective pulse outputs of delay line 12.

The description of the above discriminator circuit has been concerned with the identification of input signals on the basis of pulse widths and the associated repetition frequency. However, certain occasions may arise where the repetition frequency information is not of importance. Thus, the amplitude information achieved at the output of translator 3 can be extracted by suitable amplitude sensitive devices and converted to digital form for recording of the amplitude information only in recording devices. In this latter situation, of course, the repetition frequency information would not be present.

While I have described above the principles of my invention in connection with specific apparatus, it is to be clearly understood that this description is made only by way of example and not as a limitation to the scope of my invention as set forth in the objects thereof and in the accompanying claims.

I claim:

1. A signal translator to translate pulse signals of different time duration into amplitude pulses having discrete amplitude levels which are a function of the time duration of the pulse signals comprising a delay line of given time delay, a plurality of taps disposed along said delay line to divide said time delay in accordance with a geometric progression into a plurality of different sequential time intervals, means to couple the time duration pulse signals to said plurality of taps in parallel, and means to remove amplitude pulses from one end of said delay line having discrete amplitude levels determined by the peak amplitude established in the overlap of said time duration pulse signals at certain of said taps.

2. A signal translator to translate pulse signals of different time duration into amplitude pulses having discrete amplitude levels which are a function of the time duration of the pulse signals comprising a delay line of given time delay, a plurality of taps disposed along said delay line to divide said time delay in accordance with a geometric progression into a plurality of different sequential time intervals, resistive means to couple the time duration pulse signals to each of said plurality of taps in parallel, and means to remove amplitude pulses from one end of said delay line having discrete amplitude levels determined by the peak amplitude established in the overlap of said time duration pulse signals at certain of said taps.

3. A signal translator to translate pulse signals of different time duration into amplitude pulses having discrete amplitude levels which are a function of the time duration of the pulse signals comprising a delay line of given time delay having an output terminal in series therewith, a plurality of taps disposed along said delay line to divide said time delay in accordance with a geometric progression into a plurality of different sequential time intervals, the smaller of said time intervals being disposed adjacent said output terminal, means to couple the time duration pulse signals to said plurality of taps in parallel, and means coupled to said output terminal to remove amplitude pulses from said delay line having discrete amplitude levels determined by the peak amplitude established in the overlap of said time duration pulse signals at certain of said taps.

4. A signal translator to translate pulse signals of different time duration into amplitude pulses having discrete amplitude levels which are a function of the time duration of the pulse signals comprising a delay line of given time delay, a plurality of taps disposed along said delay line to divide said time delay in accordance with a geometric progression into a plurality of different sequential time intervals, means to couple the time duration pulse signals to said plurality of taps in parallel, means to remove amplitude pulses from one end of said delay line having discrete amplitude levels determined by the peak amplitude established in the overlap of said time duration pulse signals at certain of said taps, a unidirectional device, a condenser coupled in series relation to said unidirectional device, means coupling said one end of said delay line to said unidirectional device to charge said condenser to substantially the amplitude level of said amplitude pulses in a relatively short time, a resistor in shunt relation to provide a discharge path therefor, said resistor and said condenser having a relatively long time constant to stretch in time said amplitude pulses to increase the audio power of the repetition frequency component of said amplitude pulses, and means coupled between said unidirectional device and said condenser to remove said stretched amplitude pulses.

5. A signal translator to translate pulse signals of different time duration into amplitude pulses having discrete amplitude levels which are a function of the time duration of the pulse signals comprising a delay line of given time delay, a plurality of taps disposed along said delay line to divide said time delay in accordance with a geometric progression into a plurality of different sequential time intervals, resistive means to couple the time duration pulse signals to each of said plurality of taps in parallel, means to remove amplitude pulses from one end of said delay line having discrete amplitude levels determined by the peak amplitude established in the overlap of said time duration pulse signals at certain of said taps, a unidirectional device, a condenser coupled in series relation to said unidirectional device, means coupling said one end of said delay line to said unidirectional device to charge said condenser to substantially the amplitude level of said amplitude pulses in a relatively short time, a resistor in shunt relation to said condenser to provide a discharge path therefor, said resistor and said condenser having a relatively long time constant to stretch in time said amplitude pulses to increase the audio power of the repetition frequency component of said amplitude pulses, and means coupled between said unidirectional device and said condenser to remove said stretched amplitude pulses.

6. A signal translator to translate pulse signals of different time duration into amplitude pulses having discrete amplitude levels which are a function of the time duration of the pulse signals comprising a delay line of given time delay, a plurality of taps disposed along said delay line to divide said time delay in accordance with a geometric progression into a plurality of different sequential time intervals, resistive means to couple the time duration pulse signals to each of said plurality of taps in parallel, means to remove amplitude pulses from one end of said delay line having discrete amplitude levels determined by the peak amplitude established in the overlap of said time duration pulse signals at certain of said taps, a unidirectional device, a condenser coupled in series relation to said unidirectional device, an electron discharge device having at least an anode, a cathode and a control grid, a resistive impedance coupled in the cathode circuit of said discharge device, a capacitive impedance coupling said unidirectional device to said cathode, a capacitive impedance coupled between said means responsive and said control grid to charge said condenser to substantially the amplitude level of said amplitude pulses through said unidirectional device in a relatively short time, a resistor in shunt relation to said condenser to provide a discharge path for said condenser, said resistor and said condenser having a relatively long time constant to stretch in time said amplitude pulses to increase the audio power of the repetition frequency component of said amplitude pulses, and means coupled between said unidirectional device and said condenser to remove said stretched amplitude pulses.

7. A signal discriminator to discriminate between signals of different pulse widths and different repetition frequencies comprising a delay line of given time delay, a plurality of taps disposed along said delay line to divide said time delay in accordance with a geometric progression into a plurality of different sequential time intervals, means to couple the pulse width signals in parallel to said plurality of taps, and means to remove amplitude pulses from one end of said delay line having discrete amplitude levels determined by the peak amplitude established in the overlap of said pulse width signals at certain of said taps, a pulse stretched circuit coupled to said responsive means to stretch in time said amplitude pulses to increase the audio power of the repetition frequency component of said amplitude pulses and recording means to record the output of said pulse stretcher circuit including the derived pulse width and repetition frequency information.

8. A signal discriminator to discriminate between signals of different pulse widths and different repetition frequencies comprising a delay line of given time delay, a plurality of taps disposed along said delay line to divide said time delay in accordance with a geometric progression into a plurality of different sequential time intervals, resistive means to couple the pulse width signals in parallel to said plurality of taps, means to remove amplitude pulses from one end of said delay line having discrete amplitude levels determined by the peak amplitude established in the overlap of said pulse width signals at certain of said taps, a pulse stretcher circuit coupled to said responsive means to stretch in time said amplitude pulses to increase the audio power of the repetition frequency component of said amplitude pulses, and recording means to record the output of said pulse stretcher circuit including the derived pulse width and repetition frequency information.

9. A signal discriminator to discriminate between signals of different pulse widths and different repetition frequencies comprising a delay line of given time delay having an output terminal in series therewith, a plurality of taps disposed along said delay line to divide said time delay in accordance with a geometric progression into a plurality of different sequential time intervals, the smaller of said time intervals being disposed adjacent to said output terminal, means to couple the pulse width signals to said plurality of taps in parallel, means coupled to said output terminal to remove amplitude pulses from said delay line having discrete amplitude levels determined by the peak amplitude established in the overlap of said pulse width signals at certain of said taps, a pulse stretcher circuit coupled to said responsive means to stretch in time said amplitude pulses to increase the audio power of the repetition frequency component of said amplitude pulses, and recording means to record the output of said pulse stretcher circuit including the derived pulse width and repetition frequency information.

References Cited in the file of this patent

UNITED STATES PATENTS

| | | |
|---|---|---|
| 2,227,052 | White | Dec. 31, 1940 |
| 2,283,415 | Cox | May 19, 1942 |
| 2,519,802 | Wallman | Aug. 22, 1950 |

OTHER REFERENCES

Easton: Pulse Response of Diode Voltmeters-Electronics for January 1946, page 149 (commences on page 146).

Craib: Improved Pulse Stretcher-Electronics for June 1951, pages 129–131.